2,933,463

REACTION PRODUCT OF DEXTRAN-MODIFIED POLYESTER WITH ORGANIC DIISOCYANATE AND METHOD OF PRODUCING SAME

Leo J. Novak, Dayton, Ohio, assignor to The Commonwealth Engineering Company of Ohio, Dayton, Ohio, a corporation of Ohio No Drawing. Application March 15, 1955
Serial No. 494,566

3 Claims. (Cl. 260—9)

This invention relates to elasticized polyesters and to methods of making the same. More particularly, it relates to dextran-modified polyesters which are also modified by an organic diisocyanate and which exhibit elastomeric property similar to or approximating that of rubber.

It has been proposed heretofore to prepare simple polyesters modified, i.e., elasticized, by organic diisocyanates. Those products are definitely of theromsetting type and only hardened or cured in a practical time period by heating to high baking temperature.

An object of this invention is to provide elasticized products from polyesters which are on the borderline between thermoplastic and thermosetting and may be hardened by cooling or by heating but at temperatures lower than are usually required for the setting of polyesters.

This and other objects of the invention are achieved by the provision of new products which are polyesters including dextran as a co-reactant and further modified by reaction with organic diisocyanates.

The polyesters are obtained by heating dextran, at least one unsaturated polycarboxylic acid, anhydride or functional derivative of the acid, and at least one polyhydric alcohol together until a dextran-modified fluid partial condensation product of the acid and alcohol is obtained.

Unsaturated polycarboxylic acids which may be used include maleic, fumaric, phthalic and citraconic acids, their anhydrides, and such substituted unsaturated polycarboxylic acids or functional derivatives as chlormaleic, chlorfumaric, methylethyl maleic, diethyl maleic and chloromethyl maleic acids. Typical polyhydric alcohols are ethylene glycol, di-, tri- or tetraethylene glycol, propylene glycol, dipropylene glycol, trimethylene glycol, glycerol or pentaerythritol.

The dextran may be synthesized from sucrose by the action of microorganisms of the *Leuconostoc mesenteroides* and *L. dextranicum* types. The procedure is to inoculate an appropriate sucrose-bearing nutrient medium with a culture of the microorganism or the enzyme filtered from the culture, incubate the mass until the dextran is produced in maximum yield, separate the dextran from the fermentate, purify it and, for the present purposes, reduce it to particulate condition. This native product having very high molecular weight calculated to be in the millions may be used or it may be hydrolyzed to dextran of lower molecular weight. In general the dextran component of resin may have a molecular weight between 5000 and that of the native material. Microorganisms which may be used to synthesize the dextran include those bearing the following NRRL (Northern Regional Research Laboratory) designations: *Leuconostoc mesenteroides* B-512, B-119, B-1146, B-1190, B-742, B-1191, B-1208, B-1216, B-1120, B-1144, B-523; *Streptobacterium dextranicum* B-1254 and *Betabacterium vermiforme* B-1139.

The relative proportions of the respective components may be varied and either the polycarboxylic acid or polyhydric alcohol may predominate, the dextran being used, usually, in relatively smaller amount. For instance, the dextran-modified, resinous partial condensation product may be obtained by heating a mixture of, by weight, 30% to 75% of the polycarboxylic acid, anhydride or substituted acid, from 15% to 60% of the polyhydric alcohol, and from 5% to 25% of the dextran, the total of these ingredients equalling 100%. The three materials may be mixed together directly or the dextran, or a portion thereof, may be dissolved or dispersed in the polyhydric alcohol with heating, and the solution or dispersion added to the liquid acid or anhydride, the mass being heated with agitation to reaction temperature and until a homogeneous, fluid dextran-modified partial condensate is obtained, at which time the heating is discontinued. Temperatures of 50° C. to 300° C. may be used.

The organic diisocyanate is mixed with the dextran-modified partial condensation product or reactive polyester before the latter is set in the completely reacted or condensed condition and, during such setting, reacts with the polyester to extend the chains thereof and, depending on the amount of the diisocyanate used, may also cross-link the polyester chains.

The organic isocyanates as a class may be used. Typical are 4,4'-diphenyl diisocyanate, 4,4'-diphenylene methane diisocyanate, dianisidine diisocyanate, 4,4-tolidene diisocyanate, 1,5 naphthalene diisocyanate, 4,4'-diphenyl ether diisocyanate, and p-phenylene diisocyanate. The diisocyanate is used in an amount of 0.50 to 1.5 mole per mol of the dextran-modified polyester. Mixtures of diisocyanates may be used to impart the rubber-like properties to the dextran-modified polyesters.

As noted, the polyesters modified by co-reaction of the acid and alcohol with dextran differ from the straight polyester or those mixed with copolymerizable cross-linking monoethylenically unsaturated monomers of the styrene type in being on the borderline between thermoplastic and thermosetting, the dextran serving as a co-reacted control which to the extent of the amount thereof present functions to diminish the thermosetting property. The dextran-modified polyesters may be set by either heating or cooling, but more expeditiously under one or the other condition depending on the alcohol constituent of the polyester. Those partial condensates derived from glycerol or other alcohol of more than two hydroxyl groups tend to be more definitely thermosetting and may be more expeditiously set by heating, the temperatures required being lower, however, than are needed, ordinarily, to set a polyester resin in a practical time period. Temperatures of 50° C. to 150° C. may be used for times varying inversely with the temperature between two hours and 30 minutes. The polyesters from glycerol or the like may be set, also, at room temperature, somewhat longer setting times being needed.

Those dextran-modified polyesters derived from dihydric alcohols like ethylene glycol, on the other hand, tend to be more definitely thermoplastic and may be most expeditiously set by cooling. These polyesters may, however, be set by heating under the same conditions as those derived from glycerol or a similar alcohol.

Reaction of the organic diisocyanate with the dextran-modified partially condensed polyester takes place during setting of the polyester but usually proceeds more rapidly under mild heating.

Ordinarily, in modifying polyesters with organic diisocyanates, the reactive number (sum of the acid and hydroxyl numbers) is critical. The presence of the dextran as co-reactant in the polyester also has the effect of making the obtaining of a tough but workable product on reaction of the organic diisocyanate with the polyester less dependent on the reactive number since the dextran presents a high proportion of free hydroxyl groups which tend to insure plasticity or flexibility in the product even when the acid number going to make up the reactive number is higher than is permissible in the absence of the dextran. Also, in the case of the dextran-modified polyesters organic diisocyanates as a class may be used to impart the elastomeric properties.

The following examples are illustrative of specific embodiments of the invention, it being understood that these examples are not intended as limitative.

Example I

A dextran-modified polyester is prepared by dissolving 14.3 parts of particulate L. m. B-512 dextran (average M.W. 30,000) in 40.4 parts of hot glycerol, adding the hot solution to 45.3 parts of melted maleic anhydride, and boiling the mass for 10–15 minutes with continuous stirring. About 5 parts of 4,4'-diphenyl diisocyanate are added to the melt which is then poured into a tray coated with the carnauba wax and heated for 5 hours at 75° C. The resulting product may be processed on a rubber mill.

Example II

Example I is repeated using a polyester obtained by dissolving 10.2 parts of particulate native L. m. B-512 dextran in 16.2 parts of hot glycerol, mixing that hot solution with 51.3 parts of melted maleic anhydride containing 10.3 parts of the dextran, and boiling the mass for 12 minutes with constant stirring until a clear, homogeneous dextran-modified partially condensed polyester is obtained.

Example III

A fluid, polyester is made by dissolving 11.6 parts of particulate L. m. B-512 dextran (average M.W. about 30,000) in 52 parts of hot ethylene glycol, adding the hot solution to 36.4 parts of melted maleic anhydride, and boiling the mass for 15 minutes. About 8 parts of 1,5-naphthalene diisocyanate are added with stirring to effect uniform distribution of the latter through the melt, which is then poured into a wax-coated tray and heated to 50° C. for two hours to obtain a product which can be processed on a rubber mill.

Other dextrans of molecular weight in the range given herein, other acids and alcohols of the type stated, and other organic diisocyanates when used in the manner exemplified, yield the elastomeric resins.

In processing the products on the rubber mill, "curing" thereof may be facilitated by the incorporation of additional diisocyanate (the same as or different from that already present in the product). Or other conventional curing agents may be added on the mill, such as alkyl ethers or hexamethylol melamine with a 2,4-dihalo naphthol as accelerator, as well as such polyisocyanates as 4,4',4''-triisocyanto triphenyl methane, 1,3,5-triisocyanto benzene and 2,4,6-triisocyanto toluene. The amount of curing agent added may vary somewhat and may be from 1% to 3% by weight of the modified polyester.

The elastomeric dextran-modified polyesters of the invention may be used as replacement, substitute, or extender for natural or known synthetic rubbers and applied for the purposes for which those materials are adapted, as for instance in tires, belts, hose, sheet packing, gaskets, molded goods, floor mats, dipped goods, sheeting, tank lining, covered rolls and other mechanical and industrial goods. Aqueous dispersions of these products may be prepared with the aid of dispersing and stabilizing agents and applied as flexible coating to various bases such as paper, textiles, metal foil, etc., the coatings only needing to be dried at room or moderately elevated temperatures. Carboxymethyl dextran is an effective dispersing and stabilizing agent for the elastomeric products in aqueous media, but other materials which facilitate dispersion of the products in aqueous media may also be used, including such dispersing and wetting agents as fatty acid soaps particularly amine soaps of the type of triethanolamine oleate or ricinoleate, sulfated alcohols, sulfonated ethers, sulfonated amide derivatives and the like.

The dispersions may be made in kneading or mixing machines or on roller mills.

Example IV

An aqueous dispersion of the product of Example I is prepared by sheeting out 50 parts of the product on a rubber mill, slowly adding to it, on the rolls, a paste of 3 parts carboxymethyl dextran derived from L. m. B-512 native dextran and containing an average of 2.9 carboxymethyl groups per anhydroglucopyranosidic unit, 5 parts triethanolamine oleate, and 5 parts concentrated ammonium hydroxide in 90 parts of water. About 40 parts of water are added on the rolls and after milling for 45 minutes, the product is put in a mixer and diluted with 190 parts of water containing 2.5 parts of concentrated ammonium hydroxide. The resulting dispersion is useful, pigmented or clear, as protective or decorative finish for paper, textiles, leather, metal foil, etc.

As will be apparent, various changes and modifications may be made within the scope of the disclosure in practicing the invention. It is to be understood, therefore, that it is not intended to limit the invention except as defined in the appended claims.

What is claimed is:

1. A resinous composition prepared by heating and reacting a mixture in parts by weight of (1) a dextran-modified resin produced by heating a mixture consisting of 30% to 75% of a substance selected from the group consisting of unsaturated polycarboxylic acids and their acid anhydrides, 15% to 60% of a monomeric polyhydric alcohol and 5% to 25% of dextran to a temperature of about 300° C., and (2) to the resultant mass introducing and reacting therewith 0.5 to 1.5 mols of an organic diisocyanate per mol of said dextran-modified resin.

2. The method of making a resinous composition which comprises mixing and reacting an organic diisocyanate with a dextran-modified resin obtained by heating a mixture of 30% to 75% of a substance selected from the group consisting of unsaturated polycarboxylic acids and their acid anhydrides, 15% to 60% of a monomeric polyhydric alcohol and 5% to 25% of dextran, in an amount of 0.5 to 1.5 mols of the diisocyanate per mol of said dextran-modified resin, and holding the mixture at the reaction temperature until it is set in hard, tough, elastomeric condition.

3. A resinous composition prepared by dissolving in parts by weight of 14.3 parts of particulate *Leuconostoc mesenteroides* NRRL B-512 dextran (average M.W. 30,000) in 40.4 parts of hot glycerol, adding the hot solution to 45.3 parts of melted maleic anhydride, boiling the mass for 10–15 minutes with continuous stirring, and thereafter introducing 5 parts of 4,4'-diphenyl diisocyanate to the resultant melt, and then pouring the mass into a tray coated with carnauba wax and heated for 5 hours at 75° C.

References Cited in the file of this patent

UNITED STATES PATENTS

| | | |
|---|---|---|
| 2,282,827 | Rothrack | May 12, 1942 |
| 2,624,768 | Toulmin | Jan. 6, 1953 |
| 2,625,535 | Mastin | Jan. 13, 1953 |
| 2,809,176 | Wenzelberger | Oct. 8, 1957 |
| 2,823,188 | Novak | Feb. 11, 1958 |

OTHER REFERENCES

Flory: Journal of Physical Chemical Chemistry, volume 46 (1942), pages 132 to 140.